United States Patent [19]

Krumrein

[11] 4,389,597
[45] Jun. 21, 1983

[54] CIRCUIT FOR A FLASHER UNIT

[75] Inventor: Gerhard Krumrein, Neuenstadt, Fed. Rep. of Germany

[73] Assignee: Licentia Patent-Verwaltungs-GmbH, Frankfurt am Main, Fed. Rep. of Germany

[21] Appl. No.: 244,257

[22] Filed: Mar. 16, 1981

[30] Foreign Application Priority Data

Mar. 29, 1980 [DE] Fed. Rep. of Germany ....... 3012263

[51] Int. Cl.³ .................... H05B 39/04; H05B 41/14
[52] U.S. Cl. ............................ 315/200 A; 315/209 R; 331/113 R; 340/81 R; 340/331
[58] Field of Search ...................... 315/200 A, 209 R; 331/113 R, 145; 363/109; 361/154, 203; 340/81 R, 331

[56] References Cited

U.S. PATENT DOCUMENTS 3,673,564  6/1972  Kammerer .................. 331/113 R X
4,160,235  7/1979  Krumrein ......................... 340/81 R

FOREIGN PATENT DOCUMENTS 2647569  4/1978  Fed. Rep. of Germany .
7807000  10/1979  France .

Primary Examiner—Eugene La Roche
Assistant Examiner—Vincent DeLuca
Attorney, Agent, or Firm—Spencer & Kaye

[57] ABSTRACT

A circuit for a flasher unit comprises a flasher relay controlled by an astable multivibrator, the multivibrator having an RC-element with an inverter connected in front thereof, the inverter being controlled in response to the switching condition of the flasher relay.

8 Claims, 4 Drawing Figures

CIRCUIT FOR A FLASHER UNIT

BACKGROUND OF THE INVENTION

The invention relates to a circuit for a flasher unit having an astable multivibrator which controls the flasher relay and has an inverter connected in front of the RC-element of the multivibrator.

SUMMARY OF THE INVENTION

It is an object of the invention to provide a fault-free circuit for a flasher unit, more particularly a circuit which is fault-free when there is a break by the supply, which can be integrated and which does not require any additional external components, such as a capacitor, designed to achieve fault-free operation.

According to a first aspect of the invention, there is provided a circuit for a flasher unit comprising an astable multivibrator including an RC-element and an inverter connected in front of said RC-element, a flasher relay controlled by said astable multivibrator, and means for controlling said inverter of said astable multivibrator in response to the switching condition of said flasher relay.

According to a second aspect of the invention, there is provided a circuit for a flasher unit comprising an astable multivibrator which controls a flasher relay and an inverter connected in front of an RC-element of the multivibrator, in which the inverter is controlled by a signal which depends on the switching condition of the flasher relay.

BRIEF DESCRIPTION OF THE DRAWINGS

The invention will now be described in greater detail, by way of example, with reference to the drawings, in which.

DESCRIPTION OF THE PREFERRED EMBODIMENT

Figure 1:
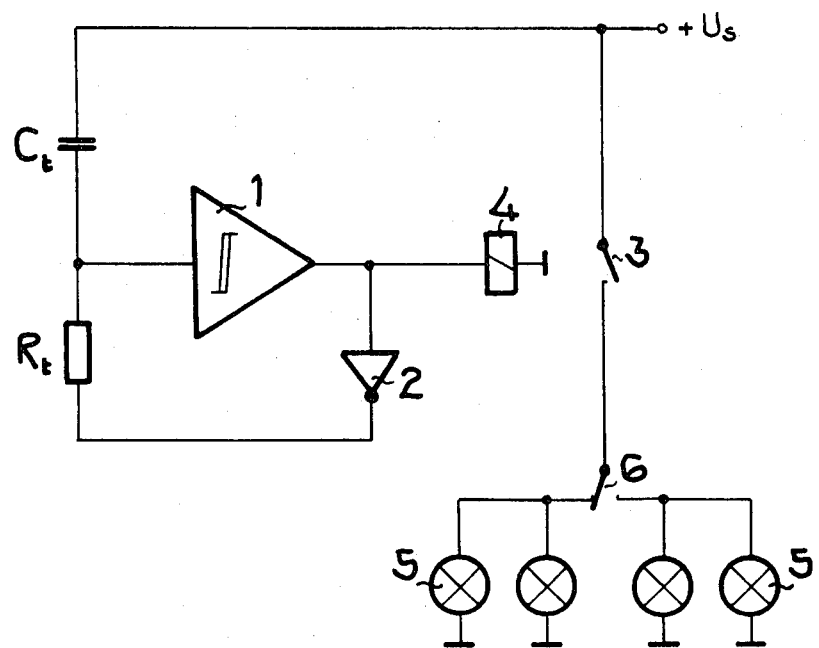
FIG. 1 shows the basic circuit of a known flasher unit.

FIG. 1 shows the basic circuit of a flasher unit in which a detection arrangement designed to check for lamp failure and a preparation circuit for attaining a fixed position of rest and a fixed starting time or point for flashing have been omitted for the sake of simplicity. An astable multivibrator which comprises a comparator 1, an inverter 2 and an RC-element $C_t R_t$ forms a substantial part of the circuit for the flasher unit. The comparator 1 is a comparator with hysteresis, which has two stable conditions. The first stable condition occurs when the input voltage of the comparator exceeds an upper voltage value. If the upper voltage value is exceeded, this has the result that logic 1 (high condition) appears at the output of the comparator 1 and the switchover threshold assumes a lower voltage value. The second stable condition is reached when the voltage falls below the lower voltage value of the switchover threshold. If the voltage falls below the lower voltage value, then the logic 0 (low condition) appears at the output of the comparator 1 and the switchover threshold changes to the upper voltage value. If the input signal of the comparator 1 is located between the lower and upper voltage values, then an output signal appears at the output of comparator 1 which depends on whether the upper voltage value had just previously been exceeded, or on whether the voltage had just previously fallen below the lower voltage value.

Figure 2:
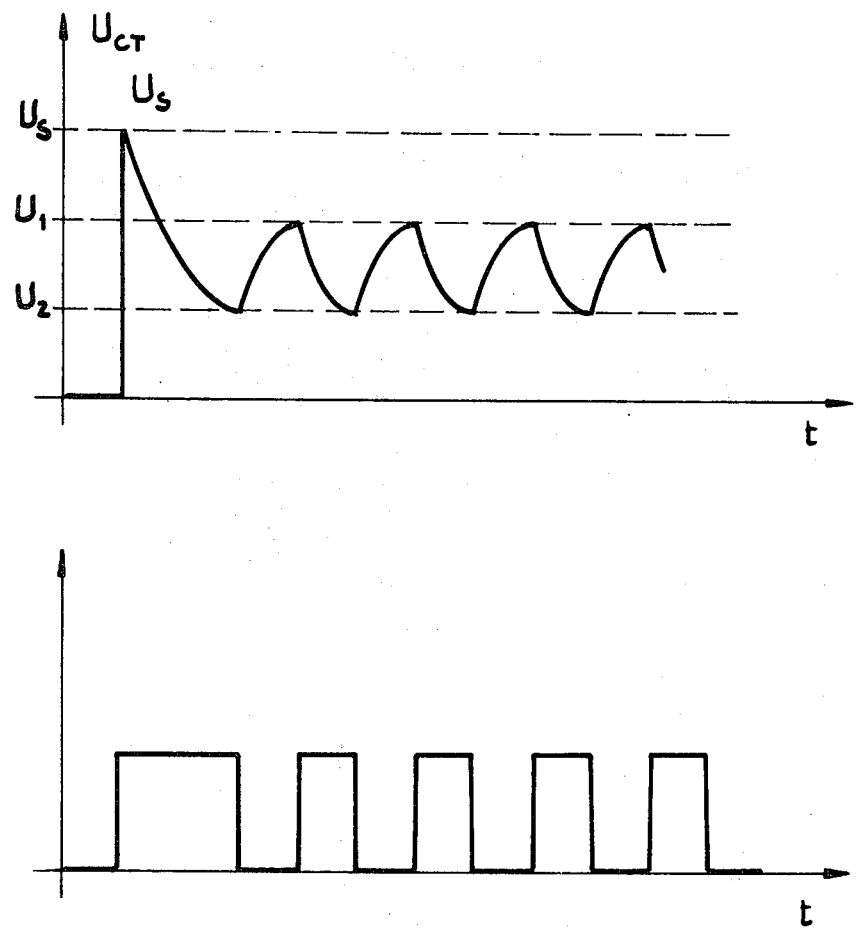
FIG. 2 shows graphically the characteristics of the circuit of FIG. 1.

FIG. 2 shows the characteristics of the circuit of FIG. 1. According to FIG. 2, the upper violtage value is $U_1$ and the lower voltage value is $U_2$. $U_s$ is the supply voltage. When the multivibrator is switched on, the voltage at the input of the comparator 1 jumps to the value of the supply voltage $U_s$, given that the capacitor $C_t$ is discharged. Since the upper voltage value $U_1$ (upper threshold) has been exceeded by the jump to $U_s$, the comparator 1 switches over to logic 1 (high). Since the inverter 2 inverts the high signal, a low signal appears across the resistor $R_t$. With a low signal across resistor $R_t$, the capacitor $C_t$ may be charged up via the resistor $R_t$. If the input voltage at the comparator 1 falls below the threshold $U_2$ then the comparator 1 switches over to the upper response threshold $U_1$ and a logic 0 (low signal) appears at its output. This has the result that the capacitor $C_t$ discharges again via $R_t$.

The charging and discharging process which has just been described is continuously repeated. A high or low signal respectively appears at the output of the comparator 1 in alternating sequence in accordance with the charging and discharging process of the capacitor. This constant change from a high signal to a low signal and vice versa causes the relay contact 3 of the relay 4 to open and close continually. If the relay contact 3 is closed, then the potential $+U_s$ reaches one connection of the flashing lights 5 so that they are able to light up. If the relay contact 3 is open, on the other hand, the flashing lights 5 are extinguished. The switch 6 switches the flashing supply from the lights 5 on one side to the lights 5 on the other side and vice versa.

Figure 3:
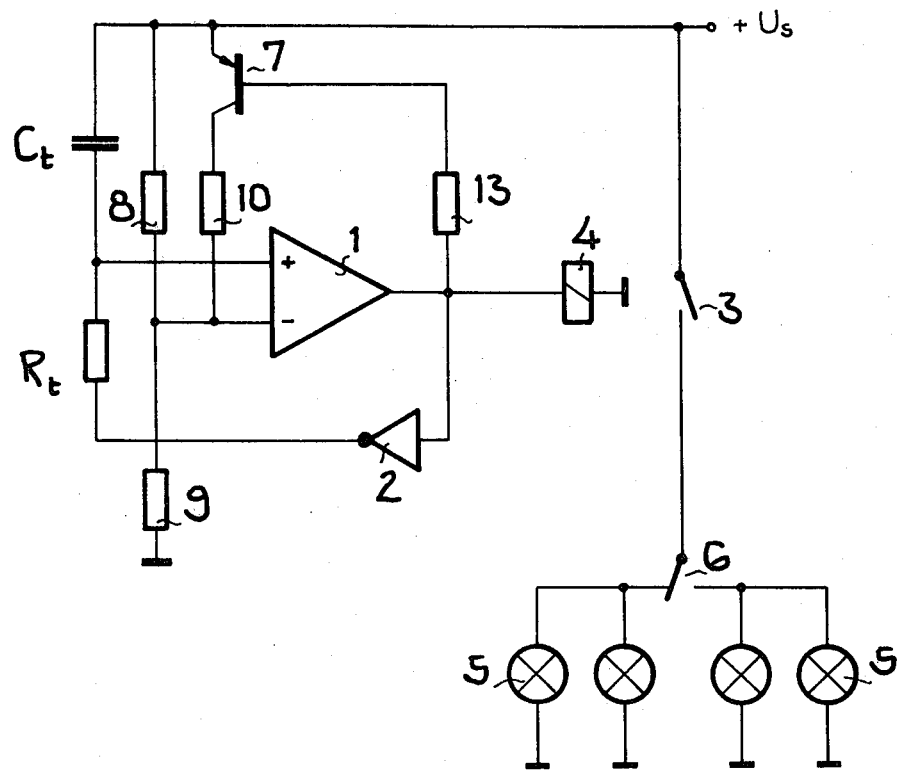
FIG. 3 shows a circuit of a flasher unit including circuit elements providing two threshold values.

FIG. 3 shows, in addition to the circuit elements of FIG. 1, circuit elements which cause the comparator circuit to have two threshold values (hysteresis). The hysteresis circuit functions as follows: if the capacitor $C_t$ is discharged ($U_{C_t}$ is greater than $U_1$), then the comparator 1 is switched to high. If the comparator 1 is in the high condition then the transistor 7 is blocked so that only the voltage dividing resistors 8 and 9 decide the switching threshold. If on the other hand the voltage $U_{C_t}$ at the capacitor $C_t$ is smaller than the lower threshold $U_2$ then the transistor 7 passes current as a result of which the switching threshold of the comparator 1 is determined by the series connection of the resistor 9 with the parallel connection of the resistor 8 and the resistor 10. This condition corresponds to the upper threshold value $U_1$.

In the case of the circuits of FIGS. 1 and 3, which are designed for a flasher unit, the signal at the capacitor $C_t$ always oscillates between the upper threshold $U_1$ and the lower threshold $U_2$ in the non-stable region of the comparator 1. These circuits have the disadvantage that breaks in the supply voltage $U_s$ cause uncontrolled tripping of the comparator 1 into the other position. Stable operation of the pulse generators which have been described is only possible with the aid of an additional capacitor which bridges or shorts the breaks in the supply voltage.

The essence of the invention lies in the fact that the feedback required in an astable multivibrator does not pass from the output of the multivibrator to the RC-element but rather from the relay contact path to the RC-element.

Figure 4:
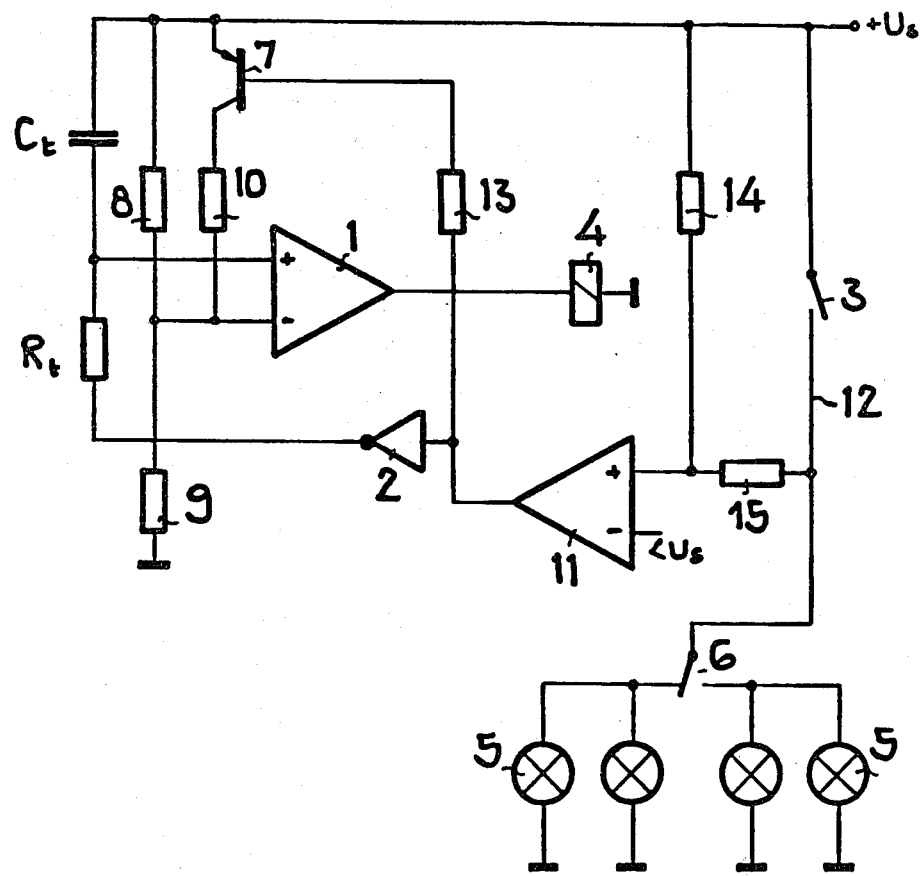
FIG. 4 shows one form of circuit for a flasher unit in accordance with the invention.

FIG. 4 shows a circuit for a flasher unit in accordance with the invention, in which, in contrast to the arrangements of FIGS. 1 and 3, the inverter 2 is not controlled by the comparator 1 of the multivibrator but rather by a signal which depends on the switching condition of the relay contact 3. In the example of FIG. 4, a second comparator 11 is provided for determining the switching condition of the relay contact 3 and is connected between the relay contact path 12 and the inverter 2. In particular, the comparator 11 has its signal input connected to the output of a voltage divider 14, 15 connected in parallel with the relay contacts 3 and its reference input connected to a reference voltage $<U_s$. This comparator 11 serves to switch over the reference voltage of the comparator 1 and to control the capacitor $C_t$, with this control taking place via the resistor $R_t$.

As a result of the fixed relation of the hysteresis part of the pulse generator circuit to the relay contact 3 of the relay 4, any interference or faults are practically eliminated. This is explained as follows: The relay has a make and break delay because of its mechanical construction. Faulty pulses and voltage breaks in which the pulse times are smaller than the delay times of the relay can no longer affect the circuit, however, since the relay takes over bridging of the faulty signals. In order to avoid faults, the charge condition of the capacitor $C_t$ must be maintained in the case of a voltage break and this is ensured for the duration of the break by a relatively large time constant $R_t$. $C_t$ as compared to the fault times and by a highly resistive input impedance of the comparator 1.

The $R_t C_t$-combination is located at the input of the circuit of FIG. 4. A voltage divider, which comprises the series connection of the resistors 8 and 9 when the transistor 7 is blocked, follows on from the $R_t C_t$-combination, while, when the transistor 7 is open, the resistor 10 is still connected in parallel with the resistor 8. The transistor 7 serves to produce the two threshold voltages of the multivibrator.

The base of the transistor 7 is connected via the resistor 13 to the inverter 2 or to the output of the comparator 11. The relay 4 is connected between the output of the comparator 1 and earth. The positive potential of the supply voltage is at one end of the $R_t C_t$ combination, at one end of the voltage divider 8, 9 connected after this combination, at the emitter of the transistor 7 and, via the resistor 14, at one input of the comparator 11. The voltage divider comprising the resistors 14 and 15 serves to match the signal at the relay contact 3 to the comparator 11. The resistor 13 serves to limit the current.

It will be understood that the above description of the present invention is susceptible to various modification changes and adaptations.

What is claimed is:

1. In a circuit for a flasher unit comprising an astable multivibrator which controls a flasher relay and an inverter connected in front of an RC-element of the multivibrator, with said inverter being controlled by a signal which depends on the switching condition of the flasher relay; the improvement wherein the feedback for said multivibrator passes from the contact path of said flasher relay to said RC-element via said inverter and a comparator for establishing and evaluating the switching condition of the relay contact.

2. A circuit for a flasher unit as defined in claim 1, the input of said inverter is connected to the output of said comparator which establishes the switching condition of the relay contact.

3. A circuit for a flasher unit as defined in claim 2, wherein said input of said inverter is connected to a transistor provided for setting two threshold values via a resistor.

4. A circuit for a flasher unit comprising an astable multivibrator including an RC-element and an inverter connected in front of said RC-element, a flasher relay controlled by said astable multivibrator and having its relay contact connected in series with a light, and means for controlling said inverter of said astable multivibrator in response to the switching condition of said flasher relay, said means including means, having its output connected to the input of said inverter, for determining the switching state of said relay contact and for providing an output signal corresponding to the respective switching state of said relay contact.

5. An astable circuit for a flasher comprising in combination: a voltage comparator having a signal voltage input, a reference voltage input and an output; an input terminal for a source of operating potential; an inverter; an RC-element including a capacitor connected between said input terminal and said signal voltage input, and a resistor connected between the output of said inverter and said signal voltage input of said comparator; a flasher relay connected between said output of said voltage comparator and a point of reference potential, said flasher relay having its relay contacts connected in series with a load between said input terminal and said point of reference potential; first means, having its output connected to the input of said inverter, for determining the switching state of said relay contacts and for providing an output signal corresponding thereto; and second means, responsive to said output signal of said first means, for switching a reference voltage applied to said reference voltage input of said voltage comparator between two different reference values.

6. The circuit defined in claim 5 wherein said first means includes a further voltage comparator, and first and second series connected resistors which are connected in parallel with said relay contacts and have their common connection point connected to the signal input of said further voltage comparator.

7. The circuit defined in claim 6 wherein said second means includes a voltage divider connected between said input terminal and said point of reference potential and having its output connected to said reference voltage input of said voltage comparator, and a switch, controlled by the output signal from said further voltage comparator, connected in series with a further resistor between said input terminal and said reference voltage input of said voltage comparator.

8. The circuit defined in claim 7 wherein said switch comprises a transistor having its emitter-collector path connected in series with said further resistor and its base connected to the input of said inverter via an additional resistor.

* * * * *